E. H. KRAUTH & E. HAMBLIN, Jr.
FLY TRAP.
APPLICATION FILED APR. 3, 1914.
1,119,434.
Patented Dec. 1, 1914.
2 SHEETS—SHEET 1.
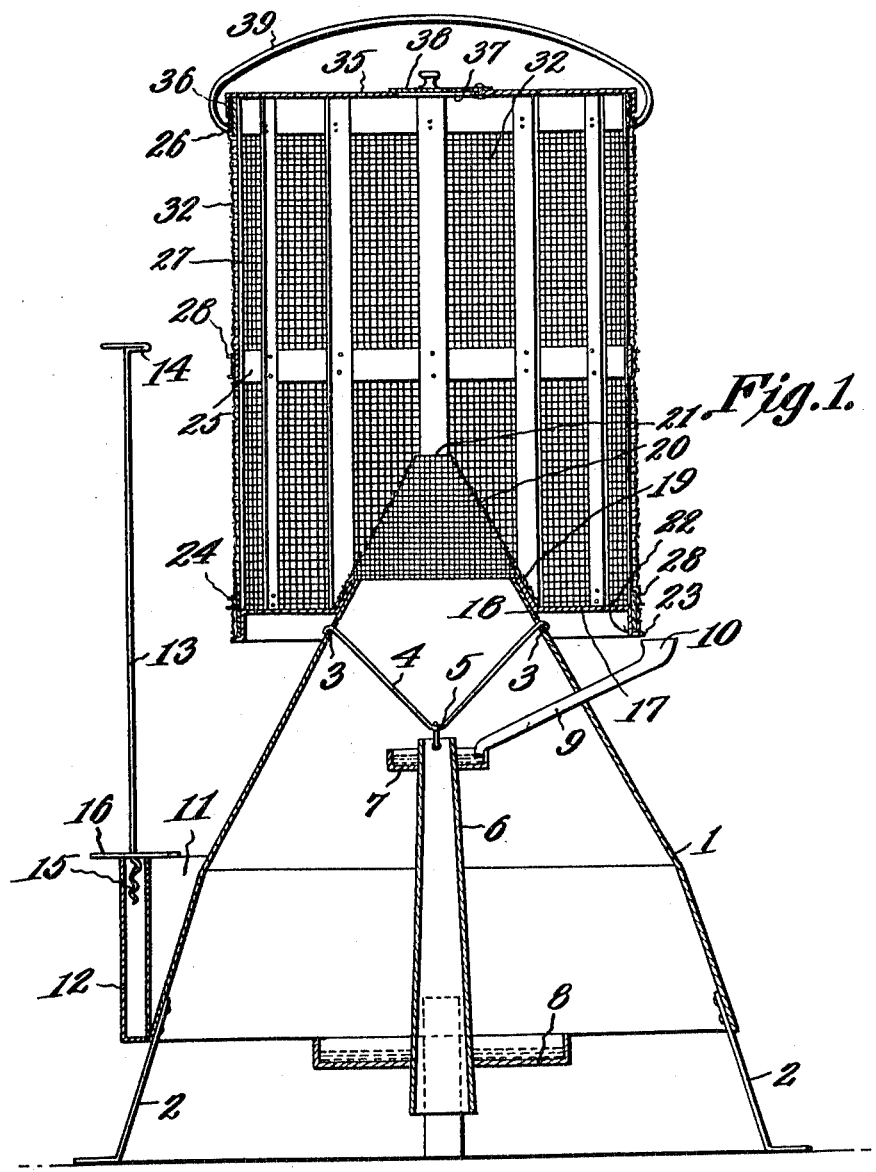
E. H. Krauth &
E. Hamblin Jr.
Inventors
Witnesses
by C. A. Snow & Co.
Attorneys

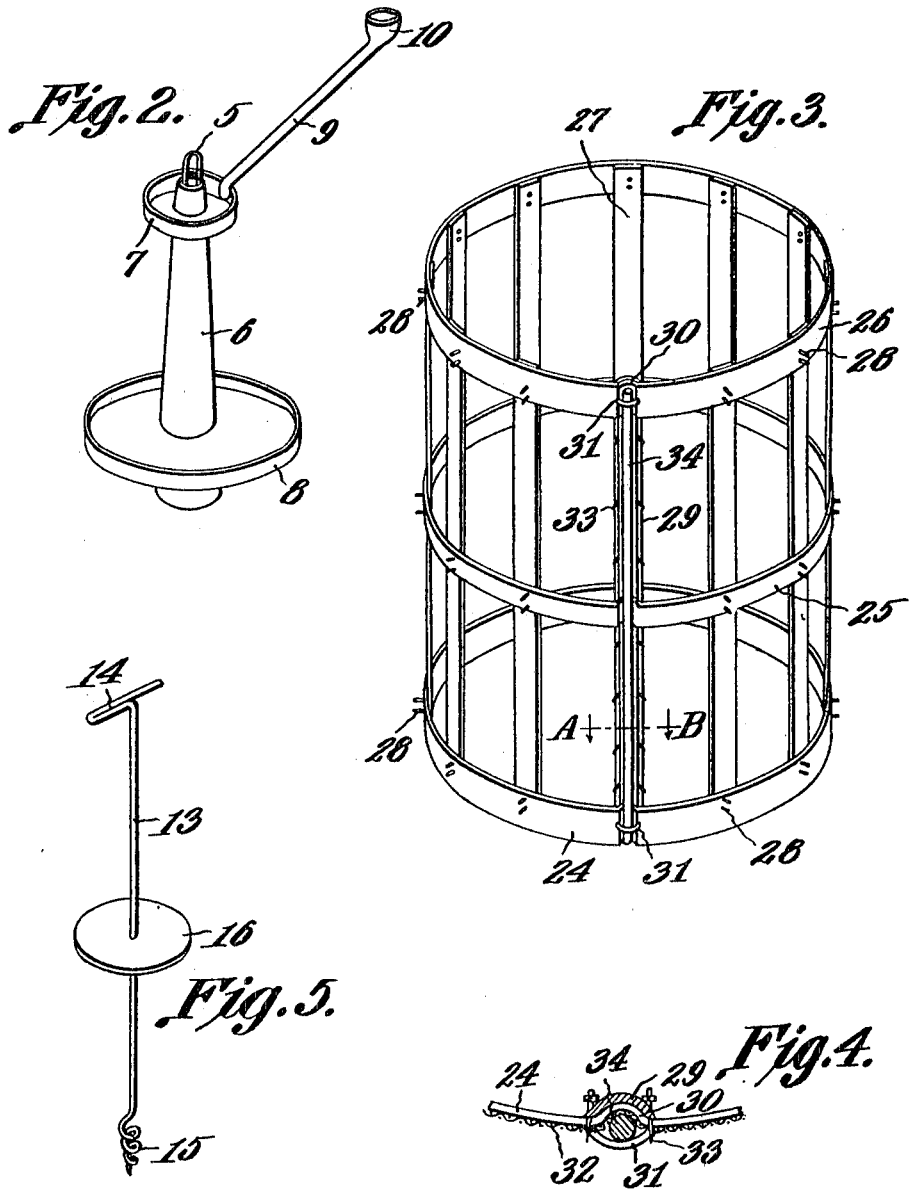

UNITED STATES PATENT OFFICE.

EDWARD H. KRAUTH AND ED HAMBLIN, JR., OF WOODWARD, OKLAHOMA.

FLY-TRAP.

1,119,434.  Specification of Letters Patent.  Patented Dec. 1, 1914.

Application filed April 3, 1914. Serial No. 829,335.

*To all whom it may concern:*

Be it known that we, EDWARD H. KRAUTH and ED HAMBLIN, Jr., citizens of the United States, residing at Woodward, in the county of Woodward and State of Oklahoma, have invented a new and useful Fly-Trap, of which the following is a specification.

This invention relates to fly traps, one of its objects being to provide a structure of this character having means whereby the flies are attracted into the trap and having means for receiving the flies where they cannot escape and where they can be reached by a torch used for destroying them.

A further object is to provide an all metal trap, the parts of which can be easily taken apart for the purpose of cleaning them.

Another object is to provide a trap of this character which can be cheaply manufactured and which has no parts likely to get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

In said drawings:—Figure 1 is a central vertical longitudinal section through the trap. Fig. 2 is a perspective view of the bait holder. Fig. 3 is a perspective view of the screen holding frame. Fig. 4 is a section on an enlarged scale through a portion of the screen and its holder, said section being taken on the line A—B Fig. 3. Fig. 5 is a perspective view of the torch.

Referring to the figures by characters of reference 1 designates a substantially frusto-conical base mounted on legs 2 or the like and provided, near its upper end, with diametrically opposed apertures 3 for the reception of the ends of a bail 4. This bail is engaged by a loop 5 extending upwardly from a tube 6 and this tube extends through the center of a small upper pan 7 and a larger lower pan 8. The tube and pans are thus suspended within the base 1 so that the lower end of the tube will be supported out of contact with the surface on which the trap is mounted, while the pan 8 will be supported approximately in the same plane with the bottom of the base 1.

A feed tube 9 extends through the upper portion of the base 1 and discharges into the upper pan 7, this tube having an enlarged outer end 10 into which the liquid to be used as bait is poured. This liquid will flow into the pan 7 and then overflow into the pan 8.

A web 11 extends outwardly from the base 1 and has a receptacle 12 designed to receive a torch. This torch is preferably in the form of a rod 13 having a handle 14 at one end while its other end is provided with a corkscrew 15 adapted to engage waste or other material saturated with alcohol or the like. A disk 16 is slidably mounted on the rod 13 and serves to close the upper end of the receptacle 12 when the torch is housed within said receptacle.

The upper or small end of the base 1 is adapted to fit snugly within the bottom of a receiver of novel form. This receiver includes a bottom plate 17 having a central circular opening 18 surrounded by a flange 19 which extends upwardly so as to form a tapered sleeve adapted to fit snugly upon the base 1 and cling thereto by frictional engagement therewith. A frusto-conical screen 20 is fitted tightly but detachably upon the sleeve 19 and extends upwardly therefrom, there being an opening 21 at the upper end of the screen and which is of such size as to permit flies to pass readily therethrough.

The disk 17 has a depending annular flange 22 formed with an outstanding ledge 23 at the lower edge thereof. This disk and its flange are adapted to fit snugly within a ring 24 constituting one end of a frame. The said frame is made up of a plurality of rings 24, 25 and 26 connected by parallel strips 27 and outstanding from the rings are prongs 28. A longitudinally grooved strip 29 also connects the rings and those portions of the rings bridging the groove in strip 29 are depressed, as shown at 30. The depressions in the end rings 24 and 26 are bridged by U-shaped fasteners 31. A screen fabric 32 is wrapped around the frame shown in Fig. 3 so as to engage the prongs 28 and the ends of this fabric are placed in engagement with prongs 33 outstanding from the grooved strip 29 and are adapted to lap upon the strip 29. A holding rod 34 is then placed upon the lapping portions of the screen fabric and said fabric forced thereby back into the groove in strip 29 after which the ends of the rod are secured by means of the fasteners 31. A cover disk 35 is mounted on the top ring 26 and has an annular flange 36 which extends around said top ring. This cover disk has a central opening 37 normally closed by means of a pivoted cover 38. The diameter of this opening 37 is slightly less than that of the disk 16 so that, when the torch is inserted through the opening 37 in the manner hereinafter set forth, opening 37 will be closed by the disk 16 and flies thus prevented from escaping through the opening.

A bail 39 may be connected to the top ring 26 so as to enable the receiver to be carried readily after being lifted off of the base 1.

In using the apparatus, the parts are assembled as hereinbefore described and the bait is placed in the pans 7 and 8. This bait will attract the flies under the base 1 and they will ascend within the base and into the conical screen 20 from which they will pass through opening 21 into the receiver. Thus the flies will be trapped and, when it is desired to destroy them, it merely becomes necessary to ignite the torch and insert it through the opening 37, disk 16 closing the opening to prevent the escape of the flies.

It will be seen that the several parts of the trap can be readily taken apart for the purpose of cleaning them or replacing worn or broken pieces.

What is claimed is:—

1. A trap including a base having an inlet in the bottom thereof and an outlet at the top, a bait holder suspended within the base, a receiver having an opening in the bottom thereof for receiving the upper end of the base, said receiver including a frame, a screen fabric detachably engaging the frame, a cover disk closing the upper end of the receiver, and a frusto-conical screen extending around the inlet in the bottom of the receiver.

2. A trap including a base having an inlet at the bottom and an outlet at the top, a receiver supported by the base and having an inlet opening into which the open outlet end of the base projects, a frusto-conical screen within the receiver and extending around the inlet thereof, superposed bait pans detachably hung within the base, the upper pan being of less diameter than the lower pan, and means for directing liquid through one side of the base and into the upper pan.

3. The combination with a base having an outlet at the top thereof and means for holding bait within the base, said base being open at its bottom, of a receiver including a bottom disk having an inlet opening, a sleeve surrounding the opening, a frusto-conical screen binding upon the sleeve and extending upwardly from the bottom disk, a frame extending around and frictionally engaging the bottom disk, outstanding projections on the frame, a screen fabric engaging the projections and having lapping ends, means for binding said ends upon the frame, said means being detachable, and means for closing the upper end of the receiver.

In testimony that we claim the foregoing as our own, we have hereto affixed our signatures in the presence of two witnesses.

EDWARD H. KRAUTH.
ED HAMBLIN, Jr.

Witnesses:
RALPH F. GASTON,
E. L. LEONARD.

Copies of this patent may be obtained for five cents each, by addressing the "Commissioner of Patents, Washington, D. C."